United States Patent
Esseghir et al.

(10) Patent No.: US 9,607,728 B2
(45) Date of Patent: Mar. 28, 2017

(54) ELECTRICALLY CONDUCTIVE, MESOPHASE-SEPARATED OLEFIN MULTIBLOCK COPOLYMER COMPOSITIONS

(75) Inventors: Mohamed Esseghir, Monroe Township, NJ (US); Gary R. Marchand, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 143 days.

(21) Appl. No.: 13/703,817

(22) PCT Filed: May 26, 2011

(86) PCT No.: PCT/US2011/038051
§ 371 (c)(1),
(2), (4) Date: Dec. 12, 2012

(87) PCT Pub. No.: WO2011/159447
PCT Pub. Date: Dec. 22, 2011

(65) Prior Publication Data
US 2013/0082215 A1 Apr. 4, 2013

Related U.S. Application Data

(60) Provisional application No. 61/356,180, filed on Jun. 18, 2010.

(51) Int. Cl.
*H01B 1/04* (2006.01)
*H01B 1/24* (2006.01)
(Continued)

(52) U.S. Cl.
CPC ........... *H01B 1/24* (2013.01); *C08F 297/083* (2013.01); *H01B 1/22* (2013.01); *C08K 3/04* (2013.01);
(Continued)

(58) Field of Classification Search
CPC .. C08F 10/00; H01B 1/00; H01B 1/02; H01B 1/04
(Continued)

(56) References Cited

U.S. PATENT DOCUMENTS 3,862,056 A 1/1975 Hartman
4,018,852 A 4/1977 Schober
(Continued)

FOREIGN PATENT DOCUMENTS

| WO | 2005090427 | 9/2005 |
|---|---|---|
| WO | 2009097560 | 8/2009 |
| WO | 2010/039628 A2 | 4/2010 |

OTHER PUBLICATIONS

International Preliminary Report on Patentability for PCT App. No. PCT/US2011/038051 mail on Sep. 29, 2012.
(Continued)

*Primary Examiner* — William Young
(74) *Attorney, Agent, or Firm* — Husch Blackwell LLP (57) ABSTRACT

Free radically crosslinked, electrically conductive compositions exhibiting a highly stable volume resistivity comprise an olefin multiblock copolymer (OBC) having a high, e.g., greater than 20 mole percent comonomer content, e.g., butylene or octene, and carbon black. These compositions exhibit a highly stable volume resistivity relative to a composition similar in essentially all aspects save that the high comonomer OBC is replaced with a low comonomer OBC of similar density and melt index.

19 Claims, 1 Drawing Sheet

(51) Int. Cl.
  *C08F 297/08* (2006.01)
  *H01B 1/22* (2006.01)
  *C08K 3/04* (2006.01)
  *C08K 3/08* (2006.01)

(52) U.S. Cl.
  CPC .......... *C08K 3/08* (2013.01); *C08K 2201/001* (2013.01); *H01B 1/04* (2013.01)

(58) Field of Classification Search
  USPC ................................................ 252/511, 512
  See application file for complete search history.

(56) References Cited

U.S. PATENT DOCUMENTS

| | | | |
|---|---|---|---|
| 4,038,042 A | 7/1977 | Adelman | |
| 4,237,441 A * | 12/1980 | van Konynenburg et al. | 338/22 R |
| 4,412,941 A * | 11/1983 | Probst et al. | 252/511 |
| 4,857,600 A | 8/1989 | Gross et al. | |
| 5,246,783 A | 9/1993 | Spenadel et al. | |
| 5,272,236 A | 12/1993 | Lai et al. | |
| 5,278,272 A | 1/1994 | Lai et al. | |
| 5,346,961 A | 9/1994 | Shaw et al. | |
| 5,575,965 A | 11/1996 | Caronia et al. | |
| 5,674,947 A * | 10/1997 | Oishi et al. | 525/289 |
| 5,986,026 A | 11/1999 | Wong et al. | |
| 6,358,438 B1 | 3/2002 | Isozaki et al. | |
| 6,496,629 B2 | 12/2002 | Ma et al. | |
| 6,714,707 B2 | 3/2004 | Rossi et al. | |
| 7,652,084 B2 | 1/2010 | Chu et al. | |
| 2004/0152806 A1* | 8/2004 | Koga et al. | 524/115 |
| 2006/0199914 A1 | 9/2006 | Harris et al. | |
| 2006/0199930 A1* | 9/2006 | Li Pi Shan et al. | 526/346 |
| 2007/0145625 A1 | 6/2007 | Caronia et al. | |
| 2007/0167578 A1* | 7/2007 | Arriola et al. | 525/242 |
| 2008/0008739 A1* | 1/2008 | Hossainy et al. | 424/426 |
| 2009/0105417 A1* | 4/2009 | Walton et al. | 525/88 |

OTHER PUBLICATIONS

International Search Report for PCT App. No. PCT/US2011/038051 mail on Aug. 3, 2011.

* cited by examiner

Figure 1: Volume Resistivity at 30% carbon black loading

Figure 2: Volume Resistivity at 25% carbon black Loading, aged and un-aged samples

ELECTRICALLY CONDUCTIVE, MESOPHASE-SEPARATED OLEFIN MULTIBLOCK COPOLYMER COMPOSITIONS

CROSS REFERENCE TO RELATED APPLICATION

The present application is the national phase of PCT Patent Application No. PCT/US2011/038051 filed May 26, 2011, which claims the benefit of U.S. Ser. No. 61/356,180, filed Jun. 18, 2010. The entire content of which is incorporated by reference herein.

BACKGROUND OF THE INVENTION

1. Field of the Invention

This invention relates to wire and cable. In one aspect the invention relates to flexible wire and cable coverings while in another aspect, the invention relates to olefin multiblock copolymer (OBC) compositions from which flexible wire and cable coverings are made. In yet another aspect the invention relates to the use of high comonomer content olefin multiblock copolymers in the compositions from which flexible wire and cable coverings are made.

2. Description of the Related Art

Olefin multiblock copolymers (OBC) will produce semi-conductive compositions with more stable electrical conductivity as compared to homogeneously branched polyolefin elastomers commonly used today. For example, significant electrical conductivity and stability differences exist between representative resins from the two classes of polymers with similar melt indices (MI) and density, namely ENGAGE™ 7447 ethylene-butene homogeneously branched copolymer (0.865 g/cc density, 5 MI) or ENGAGE™ 8200 ethylene-octene homogeneously branched copolymer (0.870 g/cc density, 5 MI), and INFUSE® 9507 olefin multiblock ethylene-octene copolymer (0.865 g/cc density, 5 MI). Of continuing interest is a semiconductive composition exhibiting a low volume resistivity (<500 ohm-cm) and high performance with improved mechanical properties that is also easy to process.

SUMMARY OF THE INVENTION

High comonomer OBC has mesophase separation in the melt state with lamellar morphology. These OBC offer an even greater advantage in forming stable conductive networks with lower filler content as compared to OBC of low comonomer content. High comonomer OBC can form high performance, electrically conductive compositions with improved mechanical properties and easier processability than low comonomer OBC. Specifically, in high comonomer OBC the conductive fillers are not only preferentially located in the amorphous phase, but this phase itself is highly oriented and this leads to more stable conductive paths and less need for filler to achieve a given conductivity target.

In one embodiment the invention is a composition comprising:
A. A high comonomer olefin multiblock copolymer, and
B. Conductive filler.

In one embodiment the invention is a composition comprising in weight percent (wt %) based on the weight of the composition:
A. 70 to 99% high comonomer olefin multiblock copolymer,
B. 30 to 1% conductive filler,
C. Optionally an elastomer other than an OBC,
D. Optionally a plasticizer,
E. Optionally a cure agent, and
F. Optionally one or more additives.

In one embodiment the high comonomer OBC is an ethylene/α-olefin multiblock interpolymer comprising one or more hard segments and one or more soft segments, the hard and soft segments having a difference in mole percent (mol %) of alpha-olefin content. In one embodiment the OBC is characterized by a weight average molecular weight (Mw) of greater than (>) 40,000 grams per mole (g/mol), a molecular weight distribution, Mw/Mn or MWD, of 1.7 to 3.5, and a difference in mole percent of α-olefin content between the soft segment and the hard segment of greater than 18.5 mol %.

In one embodiment the conductive filler is at least one of carbon black and metal fiber. In one embodiment the elastomer other than OBC is at least one of a non-OBC olefin, e.g., an ethylene-propylene rubber, and a non-olefin elastomer, e.g., a silicone and/or urethane rubber. In one embodiment the plasticizer is a liquid, e.g., a liquid plasticizer oil or extender. In one embodiment the cure agent comprises peroxide and, optionally, one or more of a cure co-agent and a scorch retardant. In one embodiment the composition is crosslinked. In one embodiment the composition is formed into an article, e.g., a wire or cable covering, such as a semiconductor shield, or an insulation layer, or a protective jacket or the like. In one embodiment the composition is formed into a film or sheet, e.g., an anti-static film or sheet for electronic packaging.

DETAILED DESCRIPTION OF THE PREFERRED EMBODIMENT

Definitions

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, weight percentages, etc., is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amount of components in the composition.

"Wire" and like terms mean a single strand of conductive metal, e.g., copper or aluminum, or a single strand of optical fiber.

"Cable" and like terms mean at least one wire or optical fiber within a sheath, e.g., an insulation covering or a protective outer jacket. Typically, a cable is two or more wires or optical fibers bound together, typically in a common insulation covering and/or protective jacket. The individual wires or fibers inside the sheath may be bare, covered or insulated. Combination cables may contain both electrical wires and optical fibers. The cable, etc. can be designed for low, medium and high voltage applications. Typical cable designs are illustrated in U.S. Pat. Nos. 5,246,783, 6,496,629 and 6,714,707.

"Composition" and like terms mean a mixture or blend of two or more components.

"Polymer" means a polymeric compound prepared by polymerizing monomers, whether of the same or a different type. The generic term "polymer" embraces the terms "homopolymer," "copolymer," "terpolymer", "interpolymer" and the like.

"Interpolymer" means a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

"Ethylene/α-olefin interpolymer" generally refers to polymers comprising ethylene and an α-olefin having 3 or more carbon atoms. Preferably, ethylene comprises the majority mole fraction of the whole polymer, i.e., ethylene comprises at least 50 mole percent of the whole polymer. More preferably, ethylene comprises at least 60 mole percent, at least 70 mole percent, or at least 80 mole percent, with the substantial remainder of the whole polymer comprising at least one other comonomer that is preferably an α-olefin having 3 or more carbon atoms. For many ethylene/octene copolymers, the preferred composition comprises an ethylene content greater than 75 mole percent of the whole polymer and an octene content of 5 to 25, preferably of 10 to 20 mole percent of the whole polymer, and more preferably of 15 to 20 mole percent of the whole polymer. For many ethylene/butene copolymers, the preferred composition comprises an ethylene content greater than 60 mole percent of the whole polymer and a butene content of 10 to 40, preferably of 20 to 35 mole percent of the whole polymer, and more preferably of 25 to 30 mole percent of the whole polymer. For many ethylene/propylene copolymers, the preferred composition comprises an ethylene content greater than 40 mole percent of the whole polymer and a propylene content of 15 to 60, preferably of 25 to 50 mole percent of the whole polymer, and more preferably of 35 to 45 mole percent of the whole polymer. In some embodiments, the ethylene/α-olefin interpolymers do not include those produced in low yields or in a minor amount or as a by-product of a chemical process. While the ethylene/α-olefin interpolymers can be blended with one or more polymers, the as-produced ethylene/α-olefin interpolymers are substantially pure and often comprise a major component of the reaction product of a polymerization process.

"Crystalline" if employed, refers to a polymer or a segment that possesses a first order transition or crystalline melting point (Tm) as determined by differential scanning calorimetry (DSC) or equivalent technique. The term may be used interchangeably with the term "semicrystalline". The crystals may exist as stacks of closely packed lamellar crystals, lamellae forming the arms of spherulites, or as isolated lamellar or fringed micellar crystals.

"Amorphous" refers to a polymer lacking a crystalline melting point as determined by differential scanning calorimetry (DSC) or equivalent technique.

"Multiblock copolymer", "segmented copolymer" and like terms mean a polymer comprising two or more chemically distinct regions or segments (also referred to as "blocks") preferably joined in a linear manner, that is, a polymer comprising chemically differentiated units which are joined end-to-end with respect to polymerized ethylenic functionality, rather than in pendent or grafted fashion. In a preferred embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The multiblock copolymers are characterized by unique distributions of polydispersity index (PDI or Mw/Mn), block length distribution, and/or block number distribution due to the unique process of making the copolymers. More specifically, when produced in a continuous process, the polymers desirably possess PDI from 1.4 to 8, preferably from 1.4 to 3.5, more preferably from 1.5 to 2.5, and most preferably from 1.6 to 2.5 or from 1.6 to 2.1. When produced in a batch or semi-batch process, the polymers possess PDI from 1.4 to 2.9, preferably from 1.4 to 2.5, more preferably from 1.4 to 2.0, and most preferably from 1.4 to 1.8. "Block(s)" and "segment(s)" are here used interchangeably. In addition, the blocks of the polymer have a PDI in the range of 1.4 to 2.5, preferably in the range of 1.4 to 2.3, and more preferably in the range of 1.5 to 2.3.

"Mesophase separation" and like terms mean a process in which polymeric blocks are locally segregated to form ordered domains. Crystallization of the ethylene segments in these systems is primarily constrained to the resulting mesodomains and such systems may be referred to as "mesophase separated". These mesodomains can take the form of spheres, cylinders, lamellae, or other morphologies known for block copolymers. The narrowest dimension of a domain, such as perpendicular to the plane of lamellae, is generally greater than about 40 nanometers (nm) in the mesophase separated block copolymers of the instant invention.

The ethylene/α-olefin multiblock interpolymer may have a value of [chi]N or χN, where N is the number average block length, in the range of 2 to 20, preferably in the range of 2.5 to 15, and more preferably in the range of 3 to 10.

"High comonomer OBC" and like terms mean an ethylene/α-olefin OBC with an α-olefin comonomer, e.g., a $C_3$-$C_{12}$ alkyl, content, of at least 20, more typically of at least 25 and even more typically of at least 30, mole percent (mol %). The comonomer is located primarily, if not exclusively, in the soft segment of the copolymer.

"Low comonomer OBC" and like terms mean an ethylene/α-olefin OBC with an octene content of less than 20 mole percent.

"Halogen-free" and like terms mean that the compositions of this invention are without or substantially without halogen content, i.e., contain less than 2000 mg/kg of halogen as measured by ion chromatography (IC) or a similar analytical method. Halogen content of less than this amount is considered inconsequential to the efficacy of many products, e.g., a wire or cable covering, made from the compositions of this invention.

"Crosslinked", "cured" and similar terms mean that the polymer, before or after it is shaped into an article, was subjected or exposed to a treatment which induced crosslinking and has xylene or decalene extractables between 40 and 100 weight percent (i.e., greater than or equal to 40 weight percent gel content).

"Crosslinkable", "curable" and like terms means that the polymer, before or after shaped into an article, is not cured or crosslinked and has not been subjected or exposed to treatment that has induced substantial crosslinking although the polymer comprises additive(s) or functionality which will cause, promote or enable substantial crosslinking upon subjection or exposure to such treatment (e.g., exposure to water).

Olefin Multiblock Copolymer

In one embodiment the multiblock copolymer can be represented by the following formula:

where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, A's and B's are linked in a linear fashion, not in a branched or a star fashion. "Hard" segments refer to blocks of polymerized units in which ethylene is present in an amount greater than 95 weight percent, and preferably greater than 98 weight percent. In other words, the comonomer content in the hard segments is less than 5 weight percent, and preferably less than 2 weight percent. In one embodiment the hard segments comprise all or substantially all ethylene. "Soft" segments, on the other hand, refer to blocks of polymerized units in which the comonomer content is greater than 5 weight percent, preferably greater than 8 weight percent, greater than 10 weight percent, or greater than 15 weight percent. In the high comonomer OBC embodiments, the comonomer content in the soft segments is greater than 20 weight percent, greater than 25 weight percent, greater than 30 weight percent, greater than 35 weight percent, greater than 40 weight percent, greater than 45 weight percent, greater than 50 weight percent, or greater than 60 weight percent.

In some embodiments, A blocks and B blocks are randomly distributed along the polymer chain. In other words, the multiblock copolymers usually do not have a structure like:

In one embodiment the multiblock copolymers usually do not have a third type of block. In one embodiment each of block A and block B has monomers or comonomers randomly distributed within the block. In other words, neither block A nor block B comprises two or more segments (or sub-blocks) of distinct composition, such as a tip segment, which has a different composition than the rest of the block.

The ethylene/α-olefin high comonomer OBC interpolymers used in the practice of this invention may be characterized as mesophase separated. Domain sizes are typically in the range of 40 nm to 300 nm, preferably in the range of 50 nm to 250 nm, and more preferably in the range of 60 nm to 200 nm, as measured by the smallest dimension such as perpendicular to the plane of lamellae or the diameter of spheres or cylinders. In addition, domains may have smallest dimensions that are greater than 60 nm, greater than 100 nm, and greater than 150 nm. Domains may be characterized as cylinders, spheres, lamellae, or other morphologies known for block copolymers. The mesophase separated polymers comprise olefin multiblock copolymers in which the amount of comonomer in the soft segments as compared to that in the hard segments is such that the multiblock copolymer undergoes mesophase separation in the melt. The required amount of comonomer may be measured in mole percent and varies with each comonomer. A calculation may be made for any desired comonomer in order to determine the amount required to achieve mesophase separation. The minimum level of incompatibility, expressed as χN, to achieve mesophase separation in these polydisperse multiblock copolymers is predicted to be χN=2.0 (I. I. Potemkin, S. V. Panyukov, Phys. Rev. E. 57, 6902 (1998)). Recognizing that fluctuations usually push the order-disorder transition in commercial block copolymers to slightly higher χN, a value χN=2.34 has been used as the minimum in the calculations below. Following the approach of D J. Lohse, W. W. Graessley, Polymer Blends Volume 1: Formulation, ed. D. R. Paul, C B. Bucknall, 2000, χN can be converted to the product of χ/v and M/p where v is a reference volume, M is the number average block molecular weight and p is the melt density. The melt density is taken to be 0.78 g/cm³ and a typical value of block molecular weight is approximately 25,500 g/mol based on a diblock at an overall molecular weight of 51,000 g/mol. χ/v for cases in which the comonomer is butene or propylene is determined using 130° C. as the temperature and then performing an interpolation or extrapolation of the data provided in Table 8.1 in the reference by Lohse and Graessley. For each comonomer type, a linear regression in mole percent comonomer was performed. For cases in which octene is the comonomer, the same procedure was performed with the data of Reichart, G. C. et al, Macromolecules (1998), 31, 7886. The entanglement molecular weight at 413 K (about 140° C.) in kg/mol is taken to be 1.1. Using these parameters, the minimum difference in comonomer content is determined to be, respectively, 20.0, 30.8 or 40.7 mole percent when the comonomer is octene, butene, or propylene. When the comonomer is 1-octene, the difference in mole percent octene between the hard segment and the soft segment, Δ octene, is greater than or equal to 20.0 mole percent, more preferably greater than or equal to 22 mole percent and may also be greater than or equal to 23 mole percent, greater than or to 24 mole percent, greater than or equal to 25 mole percent and greater than or equal to 26 mole percent. In addition, the Δ octene value may be in the range of 20.0 mole percent to 60 mole percent and more preferably in the range of 22 mole percent to 45 mole percent. When the comonomer is 1-butene, the difference in mole percent butene between the hard segment and the soft segment, Δ butene, is greater than or equal to 30.8 mole percent, more preferably greater than or equal to 33.9 mole percent and may also be greater than or equal to 35.4 mole percent, greater than or equal to 36.9 mole percent, greater than or equal to 38.5 mole percent and greater than or equal to 40.0. In addition, the Δ butene value may be in the range of 30.8 mole percent to 80 mole percent, preferably in the range of 33.9 mole percent to 60 mole percent, preferably in the range of 36 mole percent to 50 mole percent and more preferably in the range of 37 mole percent to 40 mole percent. When the comonomer is propylene, the difference in mole percent propylene between the hard segment and the soft segment, Δ propylene, is greater than or equal to 40.7 mole percent, greater than or equal to 44.7 mole percent, preferably greater than or equal to 46.8 mole percent, more preferably greater than or equal to 48.8 mole percent and may also be greater than or equal to 50.9 mole percent, and greater than or equal to 52.9 mole percent. In addition, the Δ propylene value may be in the range of 40.7 mole percent to 95 mole percent, preferably in the range of 44.7 mole percent to 65 mole percent and more preferably in the range of 48.8 mole percent to 60 mole percent.

The mesophase separated ethylene/α-olefin OBC interpolymers may have characteristics of photonic crystals, periodic optical structures designed to affect the motion of photons. Certain compositions of these mesophase separated ethylene/α-olefin interpolymers appear pearlescent by eye. In some instances, films of the mesophase separated ethylene/α-olefin interpolymers reflect light across a band of wavelengths in the range between 200 nm to 1200 nm. For example, certain films appear blue via reflected light but yellow via transmitted light. Other compositions reflect light in the ultraviolet (UV) range, from 200 nm to 400 nm, while others reflect light in the infrared (IR) range, from 750 nm to 1000 nm.

In one embodiment the high comonomer OBC used in the practice of this invention comprises a one or more hard blocks and one or more soft blocks in which the ethylene/α-olefin multiblock interpolymer is characterized by a molecular weight distribution, Mw/Mn, in the range of 1.4 to 2.8 and:

(a) has at least one melting point, Tm, in degrees Celsius, and a density, d, in grams/cubic centimeter, wherein the numerical values of Tm and d correspond to the relationship:

$$Tm > -6553.3 + 13735(d) - 7051.7(d)<2>, \text{ or}$$

(b) is characterized by a heat of fusion, ΔH in J/g, and a delta quantity, ΔT, in degrees Celsius, defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero} \\ \text{and up to 130 J/g, } \Delta T > 48° \text{ C. for } \Delta H \text{ greater} \\ \text{than 130 J/g}$$

wherein the CRYSTAF peak is determined using at least 5 percent of the cumulative polymer, and if less than 5 percent of the polymer has an identifiable CRYSTAF peak, then the CRYSTAF temperature is 30° C.; or (c) is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$$Re > 1481 - 1629(d); \text{ or}$$

(d) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or (e) has a storage modulus at 25° C., G'(25° C.), and a storage modulus at 100° C., G'(100° C.), wherein the ratio of G'(25° C.) to G' (100° C. is in the range of 1:1 to 9:1; or (f) is characterized by an average block index greater than zero and up to about 1.0; and wherein the ethylene/[alpha]-olefin multiblock interpolymer is mesophase separated.

Suitable monomers for use in preparing the present OBC include ethylene and one or more addition polymerizable comonomers other than ethylene. Examples of suitable comonomers include straight-chain or branched α-olefins of 3 to 30, preferably 3 to 20, carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cyclo-olefins of 3 to 30, preferably 3 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di-and polyolefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene.

In one embodiment, the high comonomer OBC has a density of less than or equal to 0.90 grams per cubic centimeter (g/cc), or less than 0.89 g/cc. Such low density OBC are generally characterized as amorphous, flexible and having good optical properties, e.g., high transmission of visible and UV-light and low haze.

In one embodiment, the high comonomer OBC has a density from 0.85 g/cc to 0.88 g/cc.

In one embodiment the high comonomer OBC has a melt index (MI) of 0.1 to 100 grams per ten minutes (g/10 min), or of 0.5 to 50 g/10 min, or of.1 to 30 g/10 min, as measured by ASTM D 1238 (190° C./2.16 kg).

In one embodiment the high comonomer OBC has a 2% secant modulus greater than zero and less than 150, or less than 140, or less than 120, or less than 100, megapascals (MPa) as measured by the procedure of ASTM D 882-02.

In one embodiment the high comonomer OBC has a melting point of less than 125° C. The melting point is measured by the differential scanning calorimetry (DSC) method described in WO 2005/090427 (US2006/0199930).

In one embodiment, the high comonomer OBC contains 5 to 80 wt %, or 10 to 60 wt %, or 11 to 40 wt % of a hard segment. The hard segment is free of or contains less than 0.5 mol % units derived from comonomer. The olefin multiblock copolymer also contains 20 to 95 wt %, or 40 to 90 wt %, or 60 wt % to 89 wt % of a soft segment. In one embodiment the comonomer is butene or octene. Comonomer content is measured by nuclear magnetic resonance (NMR) spectroscopy.

The high-comonomer OBC are further described in WO 2009/097560.

The OBC may be modified by, for example, grafting, hydrogenation, nitrene insertion reactions, or other functionalization reactions such as those known to those skilled in the art. Preferred functionalizations are grafting reactions using a free radical mechanism. A variety of radically graftable species may be attached to the polymer, either individually, or as relatively short grafts. These species include unsaturated molecules, each containing at least one heteroatom. These species include, but are not limited to, maleic anhydride, dibutyl maleate, dicyclohexyl maleate, diisobutyl maleate, dioctadecyl maleate, N-phenylmaleimide, citraconic anhydride, tetrahydrophthalic anhydride, bromomaleic anhydride, chloromaleic anhydride, nadic anhydride, methylnadic anhydride, alkenylsuccinic anhydride, maleic acid, fumaric acid, diethyl fumarate, itaconic acid, citraconic acid, crotonic acid, and the respective esters, imides, salts, and Diels-Alder adducts of these compounds. These species also include silane compounds.

Radically graftable species of the silane class of materials may be attached to the polymer, either individually, or as relatively short grafts. These species include, but are not limited to, vinylalkoxysilanes, vinyltrimethoxysilane, vinyltriethoxysilane, vinyltriacetoxysilane, vinyltrichlorosilane, and the like. Generally, materials of this class include, but are not limited to, hydrolyzable groups, such as alkoxy, acyloxy, or halide groups, attached to silicon. Materials of this class also include non-hydrolyzable groups, such as alkyl and siloxy groups, attached to silicon.

For silane grafted OBC crosslinking may be promoted with a crosslinking catalyst, and any catalyst that will provide this function can be used in this invention. These catalysts generally include acids and bases, especially organic bases, carboxylic acids and sulfonic acids, and organometallic compounds including organic titanates, organic zirconates, and complexes or carboxylates of lead, cobalt, iron, nickel, zinc and tin. Dibutyltin dilaurate, dioctyltin maleate, dibutyltin diacetate, dibutyltin dioctoate, stannous acetate, stannous octoate, lead naphthenate, zinc caprylate, cobalt naphthenate, and the like, are examples of suitable crosslinking catalysts. Functionalized OBC are more fully described in US 2006/0199914.

The high monomer OBC typically comprises at least 70, more typically at least 75 and even more typically at least 80, wt % of the electrically conductive OBC composition. The OBC typically comprises not more than 95, more typically not more than 90 and even more typically not more than 93, wt % of the electrically conductive OBC composition.

Conductive Filler

Any conductive filler that will impart a volume resistivity of less than 1,000, preferably less than 500 and more preferably less than 250, ohm-cm, to the composition can be used in the practice of this invention. Representative conductive fillers include but are not limited to conductive carbon blacks, conductive carbons and metal particles. Mixtures of two or more of these conductive fillers can be employed in any relative proportion. The fillers may carry or contain various surface coatings or treatments, such as silanes, fatty acids, and the like.

The total conductive filler used in the practice of this invention comprises at least 1, preferably at least 10 and more preferably at least 20, wt % of the composition. The only limit on the maximum amount of filler in the composition is that imposed by practical considerations such as cost and performance, but typically a general total maximum comprises less than 50, more typically less than 36, wt % of the composition.

Carbon Black

The conductive carbon blacks can be selected from any of the carbon blacks listed in ASTM D-1765-76, which includes carbon blacks so listed in accordance with their ASTM designations: N50, N60, N110, N121, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. Carbon black also includes furnace black, acetylene black, thermal black, lamb black and Ketjen black. These carbon blacks have iodine absorptions ranging from 10 to 200 g/kg and DBP number ranging from 30 to 400 cc/100 g, nitrogen surface area ranging from 10 to 1,000 $cm^3/100$ g. The surface area is determined under ASTM D 4820-93a (Multipoint B.E.T. Nitrogen Adsorption). Generally, smaller particle sized carbon blacks are employed to the extent cost considerations permit. In one embodiment the carbon black is N110-type carbon black to achieve good weathering performance in wire and cable jacketing. In one embodiment the carbon black is conductive furnace black.

Conductive Carbon

The conductive carbon, as distinguished from conductive carbon black, includes at least one of carbon fiber, carbon nanotubes, fullerene, graphene, graphites and expanded graphite platelets. The average particle size of such material is typically of nano-scale proportions.

Metal Particles

The conductive metal particles include granules, powder, fibers, platelets, and the like. These metal particles typically have an average particle size of 0.1 to 100, more typically 0.3 to 30, microns as measured by X-ray line broadening. The metal particles may have any particle shape desired although, as is known, the shape selection may depend upon the intended end use of the metal-filled product. Spherical shapes, platelets, prismatic shapes, whiskers, and the like, can be used.

Metals that can be used as a conductive filler include, alone or in admixture with one or more other such metals, or as finely powdered alloys, aluminum, indium, tin, lead, bismuth, as well as Groups II-B through VII-B elements of the Periodic System including such as zinc, cadmium, scandium, titanium, zirconium, vanadium, chromium, molybdenum, tungsten, manganese, rhenium, iron, ruthenium, osmium, cobalt, rhodium, iridium, nickel, palladium, platinum, and the like. Particularly satisfactory for convenience and relative cheapness are aluminum, zinc, iron, nickel, tin, lead, and silver. Copper, while conductive, may in its metallic form be objectionable in some rubber compounding formulations.

Optional Elastomer

Olefin Elastomer

The optional olefin elastomers useful in the practice of this invention include both polyolefin homopolymers and interpolymers. These optional olefin elastomers specifically exclude mesophase separated OBC elastomers, but may include non-mesophase-separated OBC elastomers. Examples of polyolefin homopolymers are the homopolymers of ethylene and propylene. Examples of the polyolefin interpolymers are the ethylene/α-olefin interpolymers and the propylene/α-olefin interpolymers. The α-olefin is preferably a $C_{3-20}$ linear, branched or cyclic α-olefin (for the propylene/α-olefin interpolymers, ethylene is considered an α-olefin). Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, are α-olefins and can be used in place of some or all of the α-olefins described above. Similarly, styrene and its related olefins (for example, α-methylstyrene, etc.) are α-olefins for purposes of this invention. Illustrative polyolefin copolymers include ethylene/propylene, ethylene/butene, ethylene/1-hexene, ethylene/1-octene, ethylene/styrene, and the like. Illustrative terpolymers include ethylene/propylene/1-octene, ethylene/propylene/butene, ethylene/butene/1-octene, and ethylene/butene/styrene. The copolymers can be random or blocky, but they are not olefin multiblock copolymers as described above.

The optional olefin elastomer can also comprise one or more functional groups such as an unsaturated ester or acid, and these elastomers (polyolefins) are well known and can be prepared by conventional high-pressure techniques. The unsaturated esters can be alkyl acrylates, alkyl methacrylates, or vinyl carboxylates. The alkyl groups can have 1 to 8 carbon atoms and preferably have 1 to 4 carbon atoms. The carboxylate groups can have 2 to 8 carbon atoms and preferably have 2 to 5 carbon atoms. The portion of the copolymer attributed to the ester comonomer can be in the range of 1 up to 50 percent by weight based on the weight of the copolymer. Examples of the acrylates and methacrylates are ethyl acrylate, methyl acrylate, methyl methacrylate, t-butyl acrylate, n-butyl acrylate, n-butyl methacrylate, and 2-ethylhexyl acrylate. Examples of the vinyl carboxylates are vinyl acetate, vinyl propionate, and vinyl butanoate. Examples of the unsaturated acids include acrylic acids or maleic acids.

Functional groups can also be included in the olefin elastomer through grafting which can be accomplished as is commonly known in the art. In one embodiment, grafting may occur by way of free radical functionalization which typically includes melt blending an olefin polymer, a free radical initiator (such as a peroxide or the like), and a compound containing a functional group. During melt blending, the free radical initiator reacts (reactive melt blending) with the olefin polymer to form polymer radicals. The compound containing a functional group bonds to the backbone of the polymer radicals to form a functionalized polymer. Exemplary compounds containing functional groups include but are not limited to alkoxysilanes, e.g., vinyl trimethoxysilane, vinyl triethoxysilane, and vinyl carboxylic acids and anhydrides, e.g., maleic anhydride.

More specific examples of the optional olefin elastomers useful in this invention include very low density polyethylene (VLDPE) (e.g., FLEXOMER® ethylene/1-hexene polyethylene made by The Dow Chemical Company), homogeneously branched, linear ethylene/α-olefin copolymers (e.g. TAFMER® by Mitsui Petrochemicals Company Limited and EXACT® by Exxon Chemical Company), and homogeneously branched, substantially linear ethylene/α-olefin polymers (e.g., AFFINITY® and ENGAGE® polyethylene available from The Dow Chemical Company). The more preferred polyolefin copolymers are the homogeneously branched linear and substantially linear ethylene copolymers. The substantially linear ethylene copolymers are especially preferred, and are more fully described in U.S. Pat. Nos. 5,272,236, 5,278,272 and 5,986,028.

The optional olefin elastomers useful in the practice of this invention also include propylene, butene and other alkene-based copolymers, e.g., copolymers comprising a majority of units derived from propylene and a minority of units derived from another α-olefin (including ethylene). Exemplary propylene polymers useful in the practice of this invention include the VERSIFY® polymers available from The Dow Chemical Company, and the VISTAMAXX® polymers available from ExxonMobil Chemical Company.

The optional olefin elastomers, particularly the ethylene elastomers, useful in the practice of this invention typically have, before grafting, a density of less than 0.91, preferably less than 0.90, grams per cubic centimeter (g/cc). The ethylene copolymers typically have a density greater than 0.85, preferably greater than 0.86, g/cc. Density is measured by the procedure of ASTM D-792. Generally, the greater the α-olefin content of the interpolymer, the lower the density and the more amorphous the interpolymer. Low density polyolefin copolymers are generally characterized as semi-crystalline, flexible and having good optical properties, e.g., high transmission of visible and UV-light and low haze.

The ethylene elastomers useful in the practice of this invention typically have, before grafting, a melt index greater than 0.10 and preferably greater than 1 gram per 10 minutes (g/10 min). The ethylene elastomers typically have a melt index of less than 500 and preferably of less than 100, g/10 min. Melt index is measured by the procedure of ASTM D-1238 (190° C./2.16 kg).

The optional olefin elastomer, if present, is typically used in amounts ranging from 1 to 40 wt % based on the weight of the composition. Preferably, the optional olefin elastomer is used in an amount ranging from 5 to 30, more preferably from 10 to 20, wt % based on the weight of the composition.

Non-Olefin Elastomers

The optional non-olefin elastomers useful in the practice of this invention include the silicone and urethane elastomers, styrene-butadiene rubber (SBR), nitrile rubber, chloroprene, fluoroelastomers, perfluoroelastomers, polyether block amides and chlorosulfonated polyethylene. The silicone elastomers are polyorganosiloxanes typically have an average unit formula $R_aSiO_{(4-a)/2}$ which may have a linear or partially-branched structure but is preferably linear. Each R may be the same or different. R is a substituted or non-substituted monovalent hydrocarbon group which may be, for example, an alkyl group, such as a methyl, ethyl, propyl, butyl, and octyl groups; aryl groups such as phenyl and tolyl groups; aralkyl groups; alkenyl groups, for example, vinyl, allyl, butenyl, hexenyl, and heptenyl groups; and halogenated alkyl groups, for example chloropropyl and 3,3,3-trifluoropropyl groups. The polyorganosiloxane may be terminated by any of the above groups or with hydroxyl groups. When R is an alkenyl group the alkenyl group is preferably a vinyl group or hexenyl group. Indeed alkenyl groups may be present in the polyorganosiloxane on terminal groups and/or polymer side chains.

Representative silicone rubbers or polyorganosiloxanes include, but are not limited to, dimethylvinylsiloxy-terminated polydimethylsiloxane, trimethylsiloxy-terminated polydimethylsiloxane, trimethylsiloxy-terminated copolymer of methylvinylsiloxane and dimethylsiloxane, dimethylvinylsiloxy-terminated copolymer of methylvinylsiloxane and dimethylsiloxane, dimethylhydroxysiloxy-terminated polydimethylsiloxane, dimethylhydroxysiloxy-terminated copolymer of methylvinylsiloxane and dimethylsiloxane, methylvinylhydroxysiloxy-terminated copolymer of methylvinylsiloxane and dimethylsiloxane, dimethylhexenylsiloxy-terminated polydimethylsiloxane, trimethylsiloxy-terminated copolymer of methylhexenylsiloxane and dimethylsiloxane, dimethylhexenylsiloxy-terminated copolymer of methylhexenylsiloxane and dimethylsiloxane, dimethylvinylsiloxy-terminated copolymer of methylphenylsiloxane and dimethylsiloxane, dimethylhexenylsiloxy-terminated copolymer of methylphenylsiloxane and dimethylsiloxane, dimethylvinylsiloxy-terminated copolymer of methyl(3,3,3-trifluoropropyl)siloxane and dimethylsiloxane, and dimethylhexenylsiloxy-terminated copolymer of methyl(3,3,3-trifluoropropyl)siloxane and dimethylsiloxane.

The urethane elastomers are prepared from reactive polymers such as polyethers and polyesters and isocyanate functional organic compounds. One typical example is the reaction product of a dihydroxy functional polyether and/or a trihydroxy functional polyether with toluene diisocyanate such that all of the hydroxy is reacted to form urethane linkages leaving isocyanate groups for further reaction. This type of reaction product is termed a prepolymer which may cure by itself on exposure to moisture or by the stoichiometric addition of polycarbinols or other polyfunctional reactive materials which react with isocyanates. The urethane elastomers are commercially prepared having various ratios of isocyanate compounds and polyethers or polyesters.

The most common of the urethane elastomers are those containing hydroxyl functional polyethers or polyesters and, low molecular weight polyfunctional, polymeric isocyanates. Another common material for use with hydroxyl functional polyethers and polyesters is toluene diisocyanate.

Nonlimiting examples of suitable urethane rubbers include the PELLETHANE™ thermoplastic polyurethane elastomers available from the Lubrizol Corporation; ESTANE™ thermoplastic polyurethanes, TECOFLEX™ thermoplastic polyurethanes, CARBOTHANE™ thermoplastic polyurethanes, TECOPHILIC™ thermoplastic polyurethanes, TECOPLAST™ thermoplastic polyurethanes, and TECOTHANE™ thermoplastic polyurethanes, all available from Noveon; ELASTOLLAN™ thermoplastic polyurethanes and other thermoplastic polyurethanes available from BASF; and additional thermoplastic polyurethane materials available from Bayer, Huntsman, Lubrizol Corporation, Merquinsa and other suppliers. Preferred urethane rubbers are those so-called "millable" urethanes such as MILLATHANE™ grades from TSI Industries.

Additional information on such urethane materials can be found in Golding, Polymers and Resins, Van Nostrande, 1959, pages 325 et seq. and Saunders and Frisch, Polyurethanes, Chemistry and Technology, Part II, Interscience Publishers, 1964, among others.

The optional silicone and urethane rubbers can be used alone or in combination with one another, and are typically used in amounts ranging from 1 to 40 wt % based on the weight of the composition. Preferably, these optional rubbers are used in an amount ranging from 5 to 30, more preferably from 10 to 20, wt % based on the weight of the composition.

Optional Plasticizer

The optional plasticizers (which term as here used includes not only conventional plasticizers, but also oil extenders, waxes, paraffins and solvents) useful in the practice of this invention include, but are not limited to, phthalic acid diesters (also known as "phthalates") such as di-isononyl phthalate (DINP), diallyl phthalate (DAP), di-2-ethylhexyl-phthalate (DEHP), dioctyl phthalate (DOP) and diisodecyl phthalate (DIDP); trimellitates such as trimethyl trimellitate, n-octyl trimellitate, and tri-(2-ethylhexyl)trimellitate; adipate-based plasticizers such as bis(2-ethylhexyl) adipate, dimethyl adipate and dioctyl adipate; sebacate-based plasticizers such as dibutyl sebacate; maleates such as dibutyl maleate; benzoates; sulfonamides such as N-ethyl toluene sulfonamide; organophosphates; polybutene; glycols/polyethers such as triethylene glycol dihexanoate; paraffinic process oils such as SUNPAR™ 2280 (Sunoco Corp.); specialty hydrocarbon fluids, and polymer modifiers; and those derived from renewable sources (i.e., biochemical plasticizers) such as epoxidized grain, e.g., soybean, corn, etc., oil. Mixtures of plasticizers are often used to obtain optimum properties.

If present, then the optional plasticizer typically comprises from greater than 0, e.g., 0.01 to 30 wt % of the composition. Preferably, the optional plasticizer is used in an amount ranging from 1 to 20, more preferably from 5 to 15, wt % based on the weight of the composition.

Optional Curing Agent

In one embodiment the semiconductive shield compositions of this invention are crosslinked, either fully or partially. In those embodiments in which the composition is to be crosslinked, it typically contains at least one crosslinking agent and/or promoter and/or scorch retardant to facilitate the crosslinking of the composition. These optional components include, but are not limited to, (1) a free radical initiator, e.g., an organic peroxide or an azo compound, (2) silane functionality, e.g., vinyl alkoxy silane or silane functional polyolefin with vinyl alkoxy silane typically activated with moisture, (3) a sulfur-containing curative to facilitate vulcanization, and (4) a radiation-curing agent to promote crosslinking of the composition with electromagnetic radiation, e.g., infrared (IR), ultraviolet (UV), visible, gamma ray, etc. Representative scorch inhibitors include but are not limited to 2,2,6,6-tetramethylpiperidinoxyl (TEMPO) and 4-hydroxy-2,2,6,6-tetramethylpiperidinoxyl (4-hydroxy TEMPO). Representative promoters include but are not limited to triallyl isocyanurate; ethoxylated bisphenol A dimethacrylate; α-methyl styrene dimer; and other co-agents such as those described in U.S. Pat. Nos. 5,346,961 and 4,018,852. These optional crosslinking agents, promoters and scorch inhibitors are used in known ways and in known amounts.

Free Radical Initiator

Suitable free radical initiators used as crosslinking agents are the dialkyl peroxides and diperoxyketal initiators. These compounds are described in the *Encyclopedia of Chemical Technology*, $3^{rd}$ edition, Vol. 17, pp 27-90 (1982). Mixtures of two or more free radical initiators may also be used together as the free radical initiator. In addition, free radicals can form from shear energy, heat or radiation.

In the group of dialkyl peroxides, nonlimiting examples of suitable free radical initiators are: dicumyl peroxide, di-t-butyl peroxide, t-butyl cumyl peroxide, 2,5-dimethyl-2,5-di(t-butylperoxy)-hexane, 2,5-dimethyl-2,5-di(t-amylperoxy)-hexane, 2,5-dimethyl-2,5-di(t-butylperoxy)hexyne-3, 2,5-dimethyl-2,5-di(t-amylperoxy)hexyne-3, α,α-di[(t-butylperoxy)-isopropyl]-benzene, di-t-amyl peroxide, 1,3,5-tri-[(t-butylperoxy)-isopropyl]benzene, 1,3-dimethyl-3-(t-butylperoxy)butanol, 1,3-dimethyl-3-(t-amylperoxy)butanol and mixtures of two or more of these initiators.

In the group of diperoxyketal initiators, nonlimiting examples of suitable free radical initiators include: 1,1-di(t-butylperoxy)-3,3,5-trimethylcyclohexane, 1,1-di(t-butylperoxy)cyclohexane n-butyl, 4,4-di(t-amylperoxy)valerate, ethyl 3,3-di(t-butylperoxy)butyrate, 2,2-di(t-amylperoxy) propane, 3,6,6,9,9-pentamethyl-3-ethoxycarbonylmethyl-1,2,4,5-tetraoxacyclononane, n-butyl-4,4-bis(t-butylperoxy)-valerate, ethyl-3,3-di(t-amylperoxy)-butyrate and mixtures of two or more of these initiators.

The amount of free radical initiator present in the composition can vary with the minimum amount being sufficient to afford the desired range of crosslinking. The minimum amount of free radical initiator is at least about 0.02 wt %, or at least about 0.05 wt %, or at least about 0.1, wt % based upon the weight of the crosslinkable polymer(s). The maximum amount of free radical initiator in the composition can vary, and it is typically determined by such factors as cost, efficiency and degree of desired crosslinking. The maximum amount may be less than about 15 wt %, or less than about 10 wt %, or less than about 5, wt % based upon the weight of the crosslinkable polymer(s).

Additives

The compositions of this invention may also contain additives. Representative additives include but are not limited to antioxidants, cross linking co-agents, cure boosters and scorch retardants, processing aids, coupling agents, ultraviolet stabilizers (including UV absorbers), antistatic agents, nucleating agents, slip agents, lubricants, viscosity control agents, tackifiers, anti-blocking agents, surfactants, extender oils, acid scavengers, flame retardants and metal deactivators. These additives are typically used in a conventional manner and in conventional amounts, e.g., from 0.01 wt % or less to 20 wt % or more based on the weight of the composition.

Suitable UV light stabilizers include hindered amine light stabilizers (HALS) and UV light absorber (UVA) additives. Representative UV absorber (UVA) additives include benzotriazole types such as Tinuvin 326 and Tinuvin 328 commercially available from Ciba, Inc. Blends of HAL's and UVA additives are also effective. Examples of antioxidants include hindered phenols such as tetrakis[methylene (3,5-di-tert-butyl-4-hydroxyhydro-cinnamate)]methane; bis [(beta-(3,5-ditert-butyl-4-hydroxybenzyl) methylcarboxyethyl)]-sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)-hydrocinnamate; phosphites and phosphonites such as tris(2,4-di-tert-butylphenyl) phosphite and di-tert-butylphenyl-phosphonite; thio compounds such as dilaurylthiodipropionate, dimyristylthiodipropionate, and distearylthiodipropionate; various siloxanes; polymerized 2,2,4-trimethyl-1,2-dihydroquinoline, n,n'-bis(1,4-dimethylpentyl-p-phenylenediamine), alkylated diphenylamines, 4,4'-bis(alpha, alpha-dimethylbenzyl)diphenylamine, diphenyl-p-phenylenediamine, mixed di-aryl-p-phenylenediamines, and other hindered amine anti-degradants or stabilizers.

Examples of processing aids include but are not limited to metal salts of carboxylic acids such as zinc stearate or calcium stearate; fatty acids such as stearic acid, oleic acid, or erucic acid; fatty amides such as stearamide, oleamide, erucamide, or N,N'-ethylene bis-stearamide; polyethylene wax; oxidized polyethylene wax; polymers of ethylene oxide; copolymers of ethylene oxide and propylene oxide; vegetable waxes; petroleum waxes; non ionic surfactants; silicone fluids and polysiloxanes.

Compounding

In one embodiment the components of the compositions used in the practice of this invention are added to a batch or continuous mixer for melt blending. The components can be added in any order or first preparing one or more masterbatches for blending with the other components. In one embodiment a masterbatch of conductive filler in one or a blend of resins is prepared and then added to the other resin or resins. Additives are usually blended with one or more other components before being added to the bulk resins and/or filler. In one embodiment the additives are added directly to the compounding line without the use of previously prepared masterbatches. Typically the melt blending is conducted at a temperature above the highest melting polymer but lower than the activation temperature of peroxide (if one is present). In one embodiment the peroxide is added in a subsequent step if the temperature of the composition cannot be adequately controlled to remain below the activation temperature of the peroxide. The melt blended composition is then either delivered to an extruder or an injection molding machine or passed through a die for shaping into the desired article, or converted to pellets, tape, strip or film or some other form for storage or to prepare the material for feeding to a next shaping or processing step. Optionally, if shaped into pellets or some similar configuration, then the pellets, etc. can be coated with an anti-block agent to facilitate handling while in storage.

Compounding of the compositions can be effected by standard equipment known to those skilled in the art. Examples of compounding equipment are internal batch mixers, such as a Banbury™ or Bolling™ internal mixer. Alternatively, continuous single, or twin screw, mixers can be used, such as Farrel™ continuous mixer, a Werner and Pfleiderer™ twin screw mixer, or a Buss™ kneading continuous extruder. The type of mixer utilized, and the operating conditions of the mixer, will affect properties of the composition such as viscosity, volume resistivity, and extruded surface smoothness.

A molded electrical article containing a semiconductive or other layer comprising a composition of this invention can be made via an injection molding process in which the compounded material is fed to the injection molding machine to manufacture a molded part of a given design.

A cable containing a semiconductive or other layer comprising a composition of this invention can be prepared with various types of extruders, e.g., single or twin screw types. These compositions should have extrusion capability on any equipment suitable for thermoplastic polymer extrusion. The most common fabrication equipment for wire and cable products is a single screw plasticizing extruder. A description of a conventional single screw extruder can be found in U.S. Pat. No. 4,857,600. An example of co-extrusion and an extruder therefore can be found in U.S. Pat. No. 5,575,965. A typical extruder has a hopper at its upstream end and a die at its downstream end. Granules of the polymeric compound feed through a hopper into the extruder barrel, which contains a screw with a helical flight. The length to diameter ratio of extruder barrel and screw is typically in the range of about 15:1 to about 30:1. At the downstream end, between the end of the screw and the die, there is typically a screen pack supported by a breaker plate used to filter any large particulate contaminates from the polymer melt. The screw portion of the extruder is typically divided up into three sections, the solids feed section, the compression or melting section, and the metering or pumping section. The granules of the polymer are conveyed through the feed zone into the compression zone, where the depth of the screw channel is reduced to compact the material, and the thermoplastic polymer is fluxed by a combination of heat input from the extruder barrel, and frictional shear heat generated by the screw. Most extruders have multiple barrel heating zones (more than two) along the barrel axis running from upstream to downstream. Each heating zone typically has a separate heater and heat controller to allow a temperature profile to be established along the length of the barrel. There are additional heating zones in the crosshead and die assembles, where the pressure generated by the extruder screw causes the melt to flow and be shaped into the wire and cable product which typically moves perpendicular to the extruder barrel. After shaping, thermoplastic extrusion lines typically have a water trough to cool and solidify the polymer into the final wire or cable product, and then have reel take-up systems to collect long lengths of this product. There are many variations of the wire and cable fabrication process, for example, there are alternate types of screw designs such as barrier mixer or other types, and alternate processing equipment such as a polymer gear pump to generate the discharge pressure. The compositions outlined in this disclosure can typically be processed on any fabrication equipment that is suitable for extruding wire and cable compositions.

The compositions of this invention are useful in applications in which electrically conductive, highly flexible materials are needed, such as in wire and cable, electro-static films, belts and rollers, etc.

The following examples illustrate various embodiments of this invention. All parts and percentages are by weight unless otherwise indicated.

Specific Embodiments

All samples are prepared using a laboratory scale 250 cc BRABENDER batch mixer. The mixer is initially set at 120° C. and a rotor speed of 45 revolutions per minute (rpm). In each experiment first the polymer resin is loaded into the mixer, and then the carbon black is added slowly and mixed for 15 minutes at 45 rpm. Depending on the level of carbon black and the resin, melt temperatures ranges from 130 to over 150° C. at the end of the mixing cycle. After the carbon black has been mixed, the mixer speed is reduced to about 5 rpm and the material is allowed to cool down while the mixer is operated at low speed. Once the material is cooled, the peroxide is added and the mixture is compounded for additional 5 minutes at about 8-12 rpm to incorporate the peroxide while ensuring the compound temperature remains below 125° C. to prevent premature crosslinking. The compound thus prepared is compression molded into 75 mil plaques which are cured in a Wabash Model #30-1212-451-4ST MBX press for 10 min at 175° C. Specimens are cut from the cured plaque for mechanical properties measurements. Mechanical properties measurements are conducted per ASTM D638.

Volume resistivity test specimens are 8×2×0.75 inch plaques prepared by compression molding the compound under thermoplastic conditions. The specimens are cooled to room temperature and removed from the mold. Flattened copper conductors (16 AWG) are wrapped around each plaque at each end of the plaque so that the conductors are 2 inches apart, and each is about 1 inch from a plaque end. The wrapped plaques are placed back into the 8×2 inch mold, and the plaque is cured with mounted conductors in the press for 10 min at 175° C. The plaques are then cooled, released from the mold and ready for volume resistivity testing.

The materials used are listed in Table 1. The compositions of the examples and various tensile properties are reported in Table 2.

TABLE 1

Materials Used in the Examples

INFUSE 9507 (0.866 g/cc den, 5 MI, 11% Hard Seg., DeltC8 = 18.2 mol %;
HC-OBC (0.896 g/cc den, 9.5 MI, 54% Hard Seg., DeltC8 = 27.7 mol %;
Carbon Black XC-500; and
Dicumyl Peroxide (DCP).

TABLE 2

Compositions and Properties

| | Comparative Example 1 | Inventive Example 1 | Comparative Example 2 | Inventive Example 2 |
|---|---|---|---|---|
| INFUSE 9507 (0.866 den, 5 MI, 11% Hard Seg., DeltC8 = 18.2) | 70.0 | — | 75.0 | — |
| HC-OBC (0.896 den, 9.5 MI, 54% Hard Seg., DeltC8 = 27.7) | — | 70.0 | — | 75.0 |
| Carbon Black (XC 500) | 30.0 | 30.0 | 25.0 | 25.0 |
| Total | 100.00 | 100.00 | 100.00 | 100.0 |
| DCP Peroxide added at low temperature in a second step, (wt %) | 2.5 | 2.5 | 2.5 | 2.5 |
| Shore A | 83.4 | 94.4 | 80 | 93 |
| Tensile @ break (psi) | 1981 | 3266 | 2223 | 3079 |
| Elong.@break (%) | 251 | 267 | 336 | 309 |

In Comparative Example 1 non-phase separated olefin multiblock copolymer INFUSE D9507 (5 MI, 0.866 g/cc density) and having a difference in mole percent α-olefin content between the soft segment and the hard segment (Delta C8) of about 18.2 mole percent is mixed with 30% XC-500 carbon black. The sample is aged in an oven set to 90° C. and the volume resistivity is monitored in time as the sample is aged for about 25 days. The volume resistivity data shown in FIG. 1 show a relatively stable compound initially about 100 ohm-cm, but as the aging period progresses beyond 10 days, the volume resistivity takes a turn upward, i.e. undesirable, and the sample conductivity continues deteriorated and reaches about 300 ohm-cm.

Figure 1:
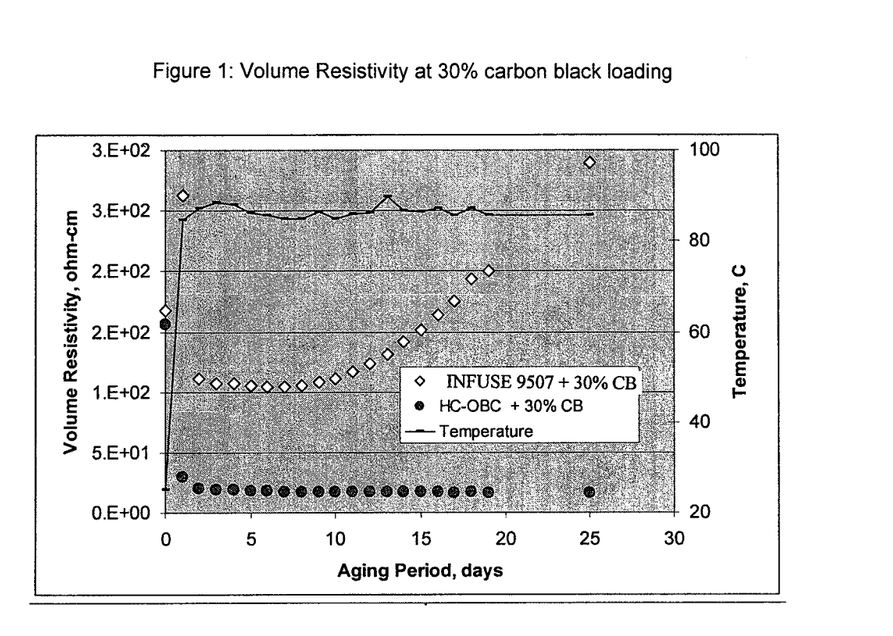
FIG. 1 is a volume resistivity versus time plot of Inventive and Comparative Examples 1.

In contrast, Inventive Example 1, using a phase separated olefin multiblock copolymer HC-OBC (0.896 g/cc den, 9.5 MI) and a Delta C8 between the soft segment and the hard segment of 27.7 mol %, with the same level of carbon black, shows a remarkably lower volume resistivity, i.e. increased conductivity, with a volume resistivity value of <20 ohm-cm and also importantly the conductivity is highly stable over the 25 days aging periods as shown in FIG. 1.

Figure 2:
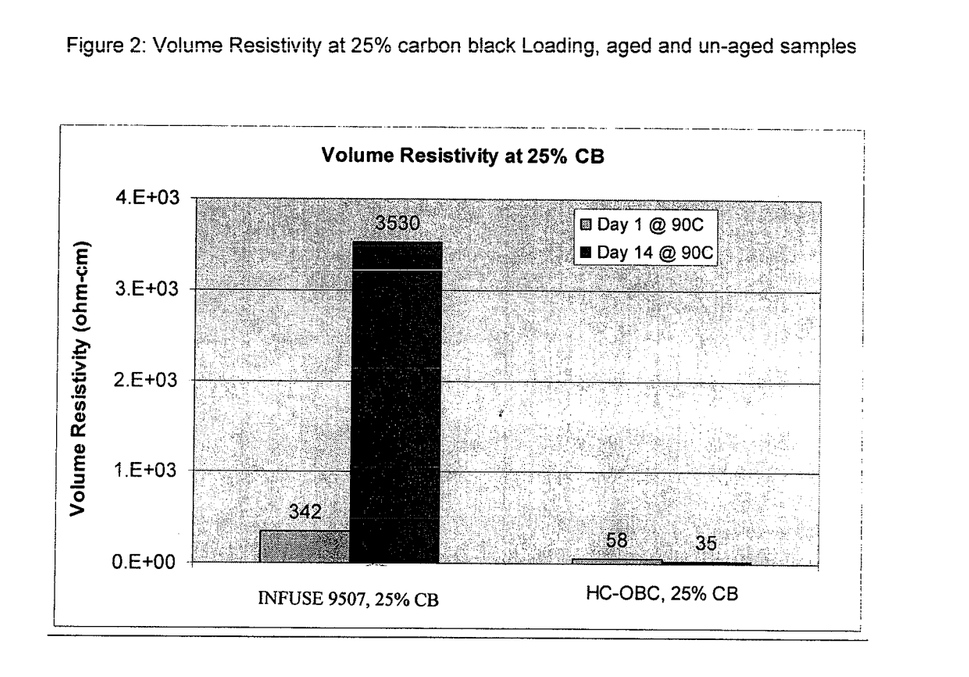
FIG. 2 is a bar graph comparing the volume resistivity of high and low comonomer OBC.

To further test the unique performance of the phase-separated system, the concentration of the conductive filler is reduced to 25% by weight. In Comparative Example 2 the initial volume resistivity increases to 342 ohm-cm and then drastically to over 3500 ohm-cm after 14 days of oven aging at 90° C. By contrast, the phase separated system shown in Inventive Example 2, using the same level of carbon black, results in a volume resistivity of 58 ohm-cm initially, and shows no increase over the 14 days aging period; in fact, the composition shows a slight improvement in conductivity, as the final volume resistivity recorded is 35 ohm-cm. These results are reported in FIG. 2.

Although the invention has been described with certain detail through the preceding description of the preferred embodiments, this detail is for the primary purpose of illustration. Many variations and modifications can be made by one skilled in the art without departing from the spirit and scope of the invention as described in the following claims.

What is claimed is:

1. A composition comprising in weight percent based on the weight of the composition:
(A) from 70 to 93% of a mesophase separated ethylene-α-olefin multiblock copolymer having an Mw/Mn from 1.4 to 2.8 and comprising hard segments and soft segments and consisting of (1) a majority mole fraction ethylene), and (2) at least 20 mole percent of a $C_3$-$C_{12}$ α-olefin comonomer, the comonomer located primarily in the soft segment of the copolymer with (i) a difference in mole percent comonomer between the hard segment and the soft segment (Δ comonomer) of 22 to 45 mole percent, and (ii) the hard segments and the soft segments are mesophase separated to form locally segregated ordered domains having a size from greater than 40 nm to 300 nm as measured in the smallest dimension, (B) from at least 20% to less than 36% conductive filler, in which the conductive filler is at least one of a conductive carbon black, conductive carbon and metal filler, (C) Optionally an elastomer other than the ethylene-α-olefin high comonomer, mesophase-separated olefin multiblock copolymer, (D) Optionally a plasticizer, (E) Optionally a cure agent, (F) Optionally one or more additives, and the composition has a volume resistivity less than 500 ohm-cm.

2. The composition of claim 1 in which the conductive filler as at least one of carbon black, graphene and carbon nanotubes.

3. The composition of claim 1 in which the metal filler comprises at least one of aluminum, zinc, iron, nickel, tin, lead, and silver.

4. The composition of claim 1 in which the optional elastomer is at least one of a polyolefin homopolymer, polyolefin interpolymer and a non-phase separated olefin multiblock copolymer, and is present in an amount of 1 to 35 wt % based on the weight of the composition.

5. The composition of claim 1 in which the optional elastomer is a non-olefin elastomer comprising at least one of silicone elastomer, urethane elastomer, styrene-butadiene rubber (SBR), nitrile rubber, chloroprene, fluorelastomer, perfluoroelastomer, polyether block amide and chlorosulfonated polyethylene, and is present in an amount of 1 to 35 wt % based on the weight of the composition.

6. The composition of claim 5 in which the plasticizer is present in an amount of 1 to 20 wt % based on the weight of the composition.

7. The composition of claim 4 in which the elastomer is present and at least one of the mesophase-separated olefin multiblock copolymer and elastomer comprises silane functionality.

8. The composition of claim 6 in which the cure agent is present and is at least one of an organic base, carboxylic acid, sulfonic acid, and an organometallic compound.

9. The composition of claim 1 free of halogen.

10. A wire or cable article comprising the composition of claim 1.

11. The composition of claim 1 wherein the comonomer is octene.

12. The composition of claim 1 wherein the domains have a size from 60 nm to 200 nm.

13. The composition of claim 1 wherein the composition has a volume resistivity of less than 20 ohm-cm after 25 days aging.

14. The composition of claim 1 wherein the mesophase separated ethylene-α-olefin multiblock copolymer has a melt index of 0.1 to 30 g/10 min as measured by ASTM D1238 (190° C./2.16 kg).

15. The composition of claim 14 wherein the mesophase separated ethylene-α-olefin multiblock copolymer has a density less than 0.90 g/cc.

16. A composition comprising in weight percent based on the weight of the composition:

(A) a high comonomer olefin block copolymer (HC-OBC) having an Mw/Mn from 1.4 to 2.8 and having hard segments and soft segments, the HC-OBC consisting of (1) a majority mole fraction ethylene and (2) at least 20 mol % of a $C_3$-$C_{12}$ α-olefin comonomer, wherein the comonomer is located primarily in the soft segment of the HC-OBC with (i) a difference in mole percent comonomer between the hard segment and the soft segment (Δ comonomer) of 22 to 45 mole percent, and (ii) the hard segments and the soft segments are mesophase separated to form locally segregated ordered domains having a size from greater than 40 nm to 300 nm as measured in the smallest dimension;

(B) from at least 20% to less than 36% conductive filler, in which the conductive filler is at least one of a conductive carbon black, conductive carbon and metal filler;

(C) optionally an elastomer other than the ethylene-α-olefin high comonomer; mesophase-separated olefin multiblock copolymer, (D) optionally a plasticizer, (E) optionally a cure agent, (F) optionally one or more additives, and the composition has a volume resistivity less than 250 ohm-cm.

17. The composition of claim 16 comprising from 70% to 93% of the high comonomer OBC.

18. The composition of claim 1 wherein the conductive filler is carbon black.

19. The composition of claim 16 wherein the conductive filler is carbon black.

* * * * *